United States Patent
Manninen

(10) Patent No.: US 11,608,225 B2
(45) Date of Patent: Mar. 21, 2023

(54) CONTAINER APPARATUS FOR STORING AND DISPLAYING RECYCLABLE OBJECTS

(71) Applicant: John Manninen, Paradise, CA (US)

(72) Inventor: John Manninen, Paradise, CA (US)

( * ) Notice: Subject to any disclaimer, the term of this patent is extended or adjusted under 35 U.S.C. 154(b) by 214 days.

(21) Appl. No.: 17/153,838

(22) Filed: Jan. 20, 2021

(65) Prior Publication Data

US 2021/0221607 A1    Jul. 22, 2021

Related U.S. Application Data

(60) Provisional application No. 62/963,472, filed on Jan. 20, 2020.

(51) Int. Cl.
*B65F 1/00* (2006.01)

(52) U.S. Cl.
CPC ..... *B65F 1/0033* (2013.01); *B65F 2240/1123* (2013.01); *B65F 2240/1126* (2013.01); *B65F 2240/12* (2013.01)

(58) Field of Classification Search
CPC ............... B65F 1/0033; B65F 2240/12; B65F 2240/1126; B65F 2240/1123; B65D 21/0223; B65D 81/3876
See application file for complete search history.

(56) References Cited

U.S. PATENT DOCUMENTS

| | | | | |
|---|---|---|---|---|
| 808,824 A * | 1/1906 | Eick | ....... | A47B 73/00 211/74 |
| 1,687,138 A * | 10/1928 | Myers | ....... | A47F 5/112 D19/77 |
| 1,997,310 A * | 4/1935 | Roege | ....... | G09F 5/00 211/72 |
| 2,443,871 A * | 6/1948 | Shield | ....... | A47F 7/285 126/39 B |
| 2,649,207 A * | 8/1953 | Shield | ....... | A47F 1/12 211/59.2 |
| 3,612,288 A * | 10/1971 | Lesley | ....... | A47F 5/0087 108/2 |
| 3,984,004 A | 10/1976 | Devanney | | |
| 4,651,873 A | 3/1987 | Stolcenberg et al. | | |
| 4,909,401 A | 3/1990 | McConnell | | |
| 5,221,002 A * | 6/1993 | Garganese | ....... | B65D 71/50 294/169 |

(Continued)

OTHER PUBLICATIONS

International Search Report issued in application No. PCT/US2021/042242, dated Oct. 26, 2021.

*Primary Examiner* — Joseph C Rodriguez
(74) *Attorney, Agent, or Firm* — Maschoff Brennan

(57) ABSTRACT

A container storage device may include a rectangular rigid member that may include multiple apertures distributed throughout. The container storage device may include multiple flexible members affixed to the rectangular rigid member where a center point of the multiple flexible members is configured to align with a center point of the multiple apertures. The multiple flexible members may be configured to hold recyclable objects within the multiple apertures. The container storage device may include at least one elongated vertical support member affixed to the rectangular frame. The container storage device may include a base portion affixed to the at least one elongated vertical support, configured to maintain the at least one elongated vertical support in a vertical orientation.

19 Claims, 5 Drawing Sheets

(56) References Cited

U.S. PATENT DOCUMENTS

| | | | |
|---|---|---|---|
| 5,263,602 A | 11/1993 | Lathouris | |
| 6,129,220 A | 10/2000 | Decossas | |
| 6,234,326 B1 | 5/2001 | Higgins et al. | |
| 7,866,679 B1 | 1/2011 | Leon | |
| 10,842,265 B2* | 11/2020 | Buszka | F25D 31/007 |
| 2003/0196364 A1 | 10/2003 | Leon | |
| 2012/0227361 A1 | 9/2012 | Bates | |
| 2013/0015097 A1 | 1/2013 | Thornton | |
| 2018/0170638 A1 | 6/2018 | Patton | |
| 2021/0221607 A1 | 7/2021 | Manninen | |
| 2021/0229886 A1* | 7/2021 | Zacherle | B65D 71/42 |
| 2022/0127052 A1* | 4/2022 | Slovik | B65D 71/504 |

* cited by examiner

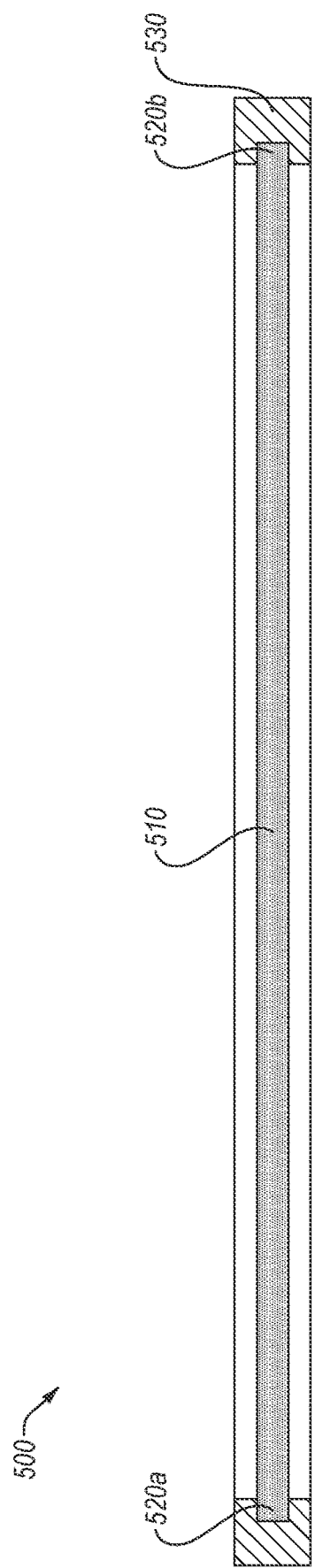

CONTAINER APPARATUS FOR STORING AND DISPLAYING RECYCLABLE OBJECTS

CROSS-REFERENCE TO RELATED APPLICATIONS

This application claims the benefit of U.S. patent Application Ser. No. 62/963,472, filed on Jan. 20, 2020; the disclosure of which is incorporated herein by reference in its entirety.

FIELD

The embodiments discussed in the present disclosure are related to a container apparatus for storing and displaying recyclable objects.

BACKGROUND

Recycling is a beneficial practice that may transform products that were previously waste into new products that may be used again. Recycling may help reduce resource waste, reduce the amount of waste sent to landfills, and reduce greenhouse gas emissions (such as from incineration or increased production of new materials). Beverage containers are a specific type of container that are often made from materials that are commonly recycled materials, such as plastic bottles, glass bottles, and aluminum cans. Common methods of recycling containers include trash-like receptacles that are specially marked for recycling.

In some circumstances, people may mistake the recycling receptacles as trash cans and mistakenly throw trash into the recycling receptacles. Similarly, people may forget to recycle their recyclable containers and mistakenly dispose of recyclable containers in a trash receptacle.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a container storage device may include a rectangular rigid member. The container storage device may include multiple apertures distributed throughout the rectangular rigid member. The container storage device may include multiple flexible members affixed to the rectangular rigid member where a center point of the multiple flexible members is configured to align with a center point of the multiple apertures. The multiple flexible members may be arranged such that one flexible member of the multiple flexible members is associated with one aperture of the multiple apertures. The multiple flexible members may be configured to hold recyclable objects within the multiple apertures.

The container storage device may include a rectangular frame which may include a top side that may include a slit that spans a lengthwise portion of the top side. The rectangular frame may include a first side that may include a first medial edge that contains a first groove. The rectangular frame may include a second side that may include a second medial edge that contains a second groove. The rectangular frame may include a bottom side that may include a third medial edge that contains a third groove. The rectangular frame may be arranged such that the first side is substantially parallel to the second side, the top side is substantially parallel to the bottom side, and the first side and the second side are substantially perpendicular to the top side and the bottom side. The rectangular frame may further be arranged such that the slit is sized and configured to allow the rectangular rigid member and the multiple flexible members affixed thereto to pass through, and the edges of the rectangular rigid member are received into the first groove, the second groove, and the third groove.

The container storage device may include at least one elongated vertical support member affixed to the rectangular frame. The container storage device may include a base portion affixed to the at least one elongated vertical support, configured to maintain the at least one elongated vertical support in a vertical orientation.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5 illustrates a top view of an example container apparatus for storing and displaying recyclable objects.

DESCRIPTION OF EMBODIMENTS

Figure 1:
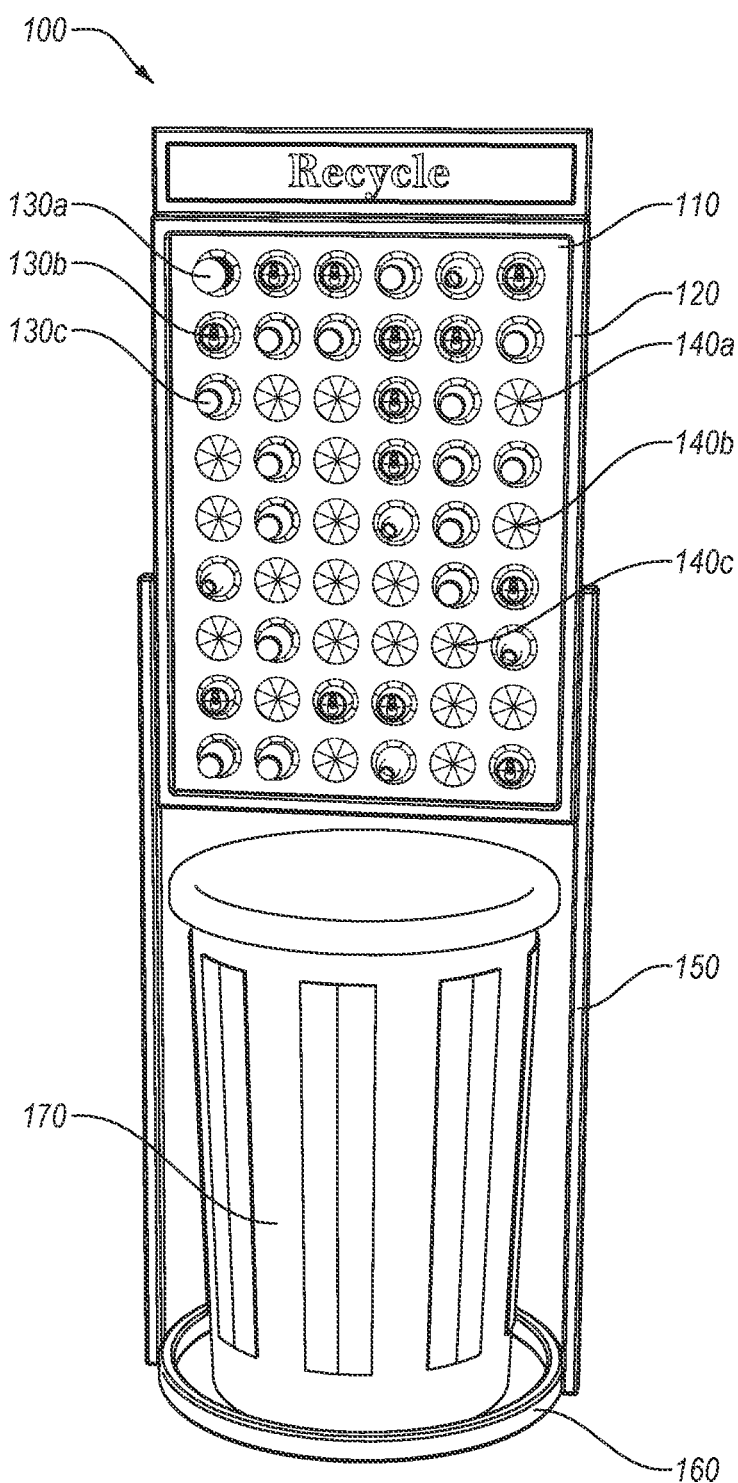
FIG. 1 illustrates a perspective view of an example container apparatus for storing and displaying recyclable objects.

The present disclosure is generally directed towards a container apparatus for storing and displaying recyclable objects. It will be understood that, in light of the present disclosure, the beverage container recycling device disclosed herein can be successfully used in connection with other types of containers and other types of recyclables.

Recycling has become more notable in recent years in an attempt to reduce waste and reuse products as often as possible. Even with its rise in prominence, reminders are often helpful to maintain awareness of the need to continually recycle. In addition to providing general reminders to recycle, specific indications of items to recycle may increase the overall effectiveness of recycling efforts. In some circumstances, recycling efforts may be hindered when recyclable containers are mixed with trash due to the need to separate the recyclable containers from the waste and the potential need to clean the recyclable containers of waste that has accumulated thereon.

Some embodiments of the present disclosure relate to a container storage device that may include a rectangular rigid member. In some embodiments, the container storage device may include multiple apertures distributed throughout the rectangular rigid member. The container storage device may include multiple flexible members affixed to the rectangular rigid member where a center point of the multiple flexible members is configured to align with a center point of the multiple apertures. In some embodiments, the multiple flexible members may be arranged such that one flexible member of the multiple flexible members is associated with one aperture of the multiple apertures. The multiple flexible members may be configured to hold recyclable objects within the multiple apertures.

In some embodiments, the container storage device may include a rectangular frame which may include a top side that may include a slit that spans a lengthwise portion of the top side. The rectangular frame may include a first side that may include a first medial edge that contains a first groove. The rectangular frame may include a second side that may include a second medial edge that contains a second groove. The rectangular frame may include a bottom side that may include a third medial edge that contains a third groove. In some embodiments, the rectangular frame may be arranged such that the first side is substantially parallel to the second side, the top side is substantially parallel to the bottom side, and the first side and the second side are substantially perpendicular to the top side and the bottom side. The rectangular frame may further be arranged such that the slit is sized and configured to allow the rectangular rigid member and the multiple flexible members affixed thereto to pass through, and the edges of the rectangular rigid member are received into the first groove, the second groove, and the third groove.

In some embodiments, the container storage device may include at least one elongated vertical support member affixed to the rectangular frame. The container storage device may include a base portion affixed to the at least one elongated vertical support, configured to maintain the at least one elongated vertical support in a vertical orientation.

In some circumstances, example embodiments of the container apparatus for storing and displaying recyclable objects may provide a visual reminder to people about the various containers that may be recycled. Additionally, the visual reminder may transcend language barriers as a purpose behind the container apparatus for storing and displaying recyclable objects may be understood without the need for specific text in any language. People have long associated throwing empty containers into trash cans and some embodiments of the present disclosure may tend to counteract people's predispositions to throw recyclable containers into trash cans, which may increase the rate of recycling and decrease the amount of waste.

In some circumstances, some embodiments of the container apparatus for storing and displaying recyclable objects may facilitate faster sorting of recyclable containers by eliminating the process of sorting trash from the recyclable containers as the recyclable containers may be deposited remotely from the trash receptacle. Additionally, some embodiments of the container apparatus for storing and displaying recyclable objects may facilitate improved recycling of containers by lessening the likelihood of trash contaminating the recyclable containers. For example, an aluminum can in a trash can may have food or other waste deposited on the aluminum can and may require cleaning before being recyclable or the aluminum can may become unrecyclable altogether.

Further, some embodiments of the container apparatus for storing and displaying recyclable objects may reduce the physical footprint of receptacles that are conventionally used to store both recyclable containers and trash. For example, using an embodiment of the container apparatus for storing and displaying recyclable objects in conjunction with a trash receptacle may reduce the number of receptacles from two to one.

In some circumstances, storing a recyclable container in a horizontal orientation may help ensure the container is empty prior to storage. Alternatively, and/or additionally, horizontal storage may provide greater confidence to individuals gathering the recyclable containers that the recyclable containers are indeed empty, or at least substantially empty, recyclable containers.

Turning to the figures, FIG. 1 illustrates a perspective view of an example container apparatus for storing and displaying recyclable objects, in accordance with at least one embodiment described in the present disclosure. The device 100 may include a rigid member 110, a frame 120, a first aperture 130a, a second aperture 130b, a third aperture 130c, collectively apertures 130, a first flexible member 140a, a second flexible member 140b, a third flexible member 140c, collectively flexible members 140, vertical supports 150, base portion 160, and trash receptacle 170.

Figure 3:
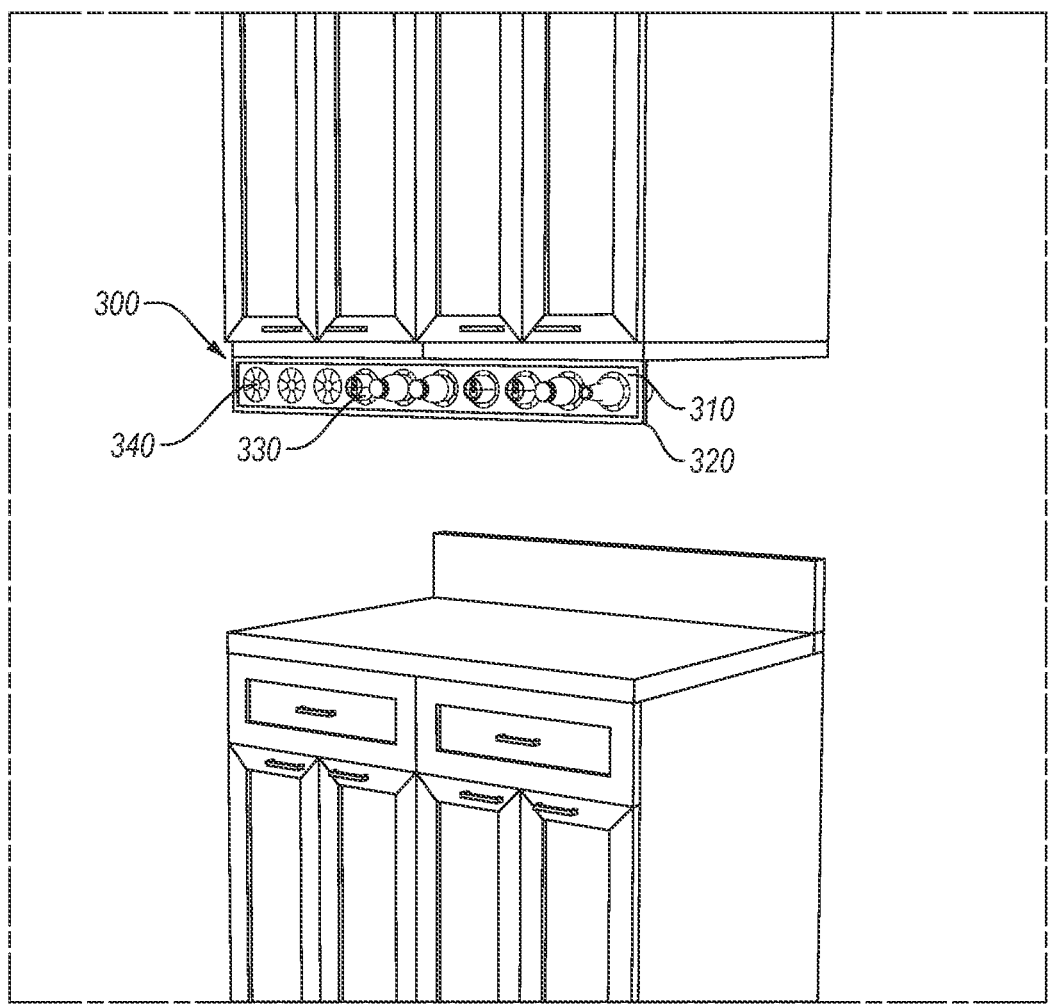
FIG. 3 illustrates a perspective view of another example container apparatus for storing and displaying recyclable objects.

In some embodiments, the rigid member 110 may include hardened materials that yield an inflexible nature to the rigid member 110. For example, the rigid member 110 may include hardened plastic, plexiglass, polyvinyl chloride (PVC), various polymers, steel, and other suitable thin, rigid materials. In some embodiments, the rigid member 110 may be rectangular in shape, as illustrated in FIG. 1, where the rigid member 110 may be longer in the vertical direction than the horizontal direction. Alternatively, and/or additionally, the rigid member 110 may be longer in the horizontal direction than the vertical direction, as shown in FIG. 3. Alternatively, and/or additionally, the rigid member 110 may take on various geometric shapes including square-like, triangular, or other geometric shapes.

In some embodiments, the rigid member 110 may include a uniform thickness. For example, the rigid member 110 may be configured to have substantially the same thickness on an upper portion, a lower portion, centrally, and along the edges. Alternatively, and/or additionally, the edges of the rigid member 110, which may be configured to be inserted into the grooves 520 (not shown in FIG. 1, but as element 520 in FIG. 5 and referenced as such herein) of the frame 120 (as discussed below), may be thinner than the other parts of the rigid member 110. In these and other embodiments, the rigid member 110 may be arranged such that when the edges thereof may be inserted into the grooves 520 of the frame 120, the non-edge portions of the rigid member 110 may be flush with the frame 120.

In some embodiments, the thickness of the rigid member 110 may vary according to the material of which the rigid member 110 is composed. For example, in instances in which the rigid member 110 includes a stronger and/or sturdier material such as steel, the rigid member 110 may include a thinner thickness. In another example, in instances in which the rigid member 110 includes a less strong/less sturdy material such as plastic, the rigid member 110 may include a greater thickness.

In some embodiments, the frame 120 may be sized and configured to receive the rigid member 110. Alternatively, and/or additionally, the frame 120 and the rigid member 110 may be comprised of substantially the same material, such that the frame 120 and the rigid member 110 may be one uniform component. In instances in which the frame 120 and the rigid member 110 are comprised of a uniform material, the uniform material may be shaped and configured to appear as though the frame 120 and the rigid member 110 are two different structures. In some embodiments, the rigid member 110 and the frame 120 may be substantially vertical. The verticality of the rigid member 110 and the frame 120 may permit recyclable containers to be stored substantially horizontal, which may provide an indication that the recyclable containers are empty or substantially empty.

In some embodiments, the frame 120 may be comprised of hard, durable materials including metal components such as aluminum or stainless steel; plastic components such as cellulose acetate or a blended nylon composition; wooden materials; and other suitable materials that may be capable of maintaining the shape of the frame 120 and capable of securing the rigid member 110 therein. The foregoing are only examples of materials that may be used with the frame 120, and that other hard, durable materials may also be suitable to be used with the frame 120.

In some embodiments, the frame 120 may have a similar geometric shape as the rigid member 110, such as rectangular, square-shaped, triangular, or other geometric shapes of the rigid member 110. In some embodiments, such as in a rectangular or square-shaped frame, the frame 120 may include a top, a bottom, and two sides, where all the components lie in a same plane. Alternatively, and/or additionally, the top and bottom may be parallel to each other, the two sides may be parallel to each other, and the top and bottom may be perpendicular to the two sides. In instances in which the frame 120 is not rectangular or square-shaped, the number of sides may differ. Alternatively, and/or additionally, the top portion may consist of more than a single edge in embodiments that are not rectangular or square-shaped.

In some embodiments, the frame 120 may include one or more tubular members, such circular tubes, rectangular tubes, rectangular prisms, and the like. In some embodiments, a medial portion of the two sides and bottom elements of the frame 120 may include a groove 520 sized and configured to receive an edge of the rigid member 110. For example, the groove 520 on the frame 120 may be sized to be marginally larger than the thickness of the rigid member 110 such that the rigid member 110 slides in to, and is retained in, the groove 520 on the frame 120. In some embodiments, the rigid member 110 may be secured to the frame 120 using attachment mechanisms. For example, attachment mechanisms may include fasteners such as nuts and bolts, screws, rivets, glue and glue-like adhesives, hook and loop fasteners, or other similar mechanisms.

In some embodiments, the top element of the frame 120 may contain a slit 510 (not shown in FIG. 1, but as element 510 in FIG. 5) that spans the length of the top element. For example, the slit 510 in the top element of the frame 120 may traverse the top element from the groove 520 of one of the side elements to the groove 520 of the other of the side elements. In some embodiments, the slit 510 in the top element of the frame 120 may be sized and configured to receive the rigid member 110 and may allow the rigid member 110 to pass through the top element after which it may be received into the groove 520 of the frame 120. For example, the slit 510 may be wide enough to receive the thickness of the rigid member 110 plus a small amount to account for the thickness of the flexible members 140 that may be attached thereto. In these and other embodiments, the thickness of the slit 510 may be marginally wider than the thickness of the groove 520 where the slit 510 may need to receive both the rigid member 110 and the flexible members 140 attached thereto.

In some embodiments, the rigid member 110 may be taller than the sides of the frame 120 such that a top portion of the rigid member 110 may extend above the top of the frame 120 and above the slit 510 in the frame 120. For example, the rigid member 110 may be sized and configured such that all the apertures 130 therein are confined within the borders of the frame 120, but a top portion of the rigid member 110, which may include recycle text or a recycle logo, may extend above the frame 120.

In some embodiments, the rigid member 110 may include multiple apertures distributed ubiquitously across the rigid member 110, such as the first aperture 130*a*, the second aperture 130*b*, and the third aperture 130*c*, collectively the apertures 130. It will be appreciated that although discussed in terms of only three apertures, the number of apertures located on the rigid member 110 may include many more, for example as shown at least in FIG. 1. In these and other embodiments, the number of apertures 130 may scale based on the area of the rigid member 110 and a determined need for a number of apertures 130.

In some embodiments, the apertures 130 may be uniform in size across the rigid member 110. Alternatively, and/or additionally, the apertures 130 may vary in size across the rigid member 110. In these and other embodiments, the diameter of the apertures 130 may be large enough to accept most recyclable containers. For example, the apertures 130 may be sized to accommodate at least one or more type of recyclable containers such as aluminum soda cans, plastic bottles, or glass bottles. Alternatively, and/or additionally, the apertures 130 may be sized and configured to receive only a portion of one or more recyclable containers. For example, the apertures 130 may be sized to receive a neck portion of a bottle, but the apertures 130 may not be large enough to receive the body portion of the bottle.

In some embodiments, the rigid member 110 may include multiple flexible members attached thereto, such as the first flexible member 140*a*, the second flexible member 140*b*, and the third flexible member 140*c*, collectively the flexible members 140. The flexible members 140 are discussed in further detail with respect to FIG. 4. In some embodiments, the flexible members 140 may be bonded to the rigid member 110, such as with an adhesive, a mechanical fastener, a heat process, or a pressurized process. In these and other embodiments, the flexible members 140 may be attached to a rear facing surface of the rigid member 110. Alternatively, and/or additionally, in embodiments where the rigid member 110 is comprised of two or more adhered layers, the flexible members 140 may be secured between at least two layers of the rigid member 110.

In some embodiments, the flexible members 140 may include a circular shape, which may mirror the shape of the apertures 130. Alternatively, and/or additionally, the flexible members 140 may include different geometric shapes. In these and other embodiments, the flexible members 140 may be sized to be larger than the apertures 130, such that the flexible members 140 may attach to the rigid member 110. In some embodiments, a center point of the flexible members 140 may be aligned with a center point of the apertures 130, such that a single flexible member of the flexible members 140 may be centrally aligned with a single aperture of the apertures 130. For example, a flexible member of the flexible members 140 may be arranged in relation to an aperture of the apertures 130 such that a center point of the flexible member aligns with a center point of the aperture. In the previous example, the flexible member may be wider than the aperture so that the flexible member may attach to the rigid member 110 around the aperture.

In some embodiments, the flexible members 140 may comprise a variety of materials including, but not limited to, paper, cardboard, plastic, elastic material, rubber, silicone, and materials similar to the rigid member 110. Alternatively, and/or additionally, any of the aforementioned materials may be combined to create a more suitable flexible member 140. For example, the flexible members 140 may be primarily constructed of cardboard but may include some rubber strips on the cardboard to create a better retaining surface of the flexible members 140. It will be appreciated that various combinations may be more beneficial for differing recyclable materials and that the materials of the flexible members 140 may vary on the same device 100.

In some embodiments, the flexible members 140 may have a front-facing surface configured to interact with a recyclable container, the front-facing surface oriented in the same direction as the front of the rigid member 110. In some embodiments, the front-facing surface of the flexible members 140 may include a friction surface, configured to receive and retain a recyclable container. In some embodiments, the friction surface may be comprised of the same materials of which the flexible members 140 are constructed. For example, both the flexible member 140 and the friction surface may be constructed of silicone to receive and retain recyclable containers. In some embodiments, materials for the flexible members 140 and the friction surface may be combined to be better suited for receiving and retaining recyclable containers. For example, the flexible members 140 may be constructed of cardboard and may include rubber strips attached thereto acting as a friction surface. In these and other embodiments, it will be appreciated that the combinations of flexible members 140 and friction surfaces may vary to accommodate the most variants of recyclable containers. Alternatively, and/or additionally, the device 100 may include multiple variants of combinations of flexible members 140 and friction surface to accommodate more variants of recyclable containers.

In some embodiments, the rigid member 110 may include space for visualizations that may remind passersby and those with potentially recyclable containers to store the recyclable containers in the device 100 and not throw recyclable containers in a trash receptacle. For example, a top portion of the rigid member 110 may include text such as "recycle" and/or the recycle logo. Alternatively, and/or additionally, space may be allocated for visualizations interspersed between the apertures 130.

In some embodiments, the vertical supports 150 may include the same material as the frame 120. For example, the vertical supports 150 may include metal components such as aluminum or stainless steel; plastic components such as cellulose acetate or a blended nylon composition; wooden materials; and other suitable materials that may be capable of holding the frame 120 in a vertical orientation. In some embodiments, the vertical supports 150 may include tubular rectangular prisms similar to the shape and structure of the frame 120.

In some embodiments, the vertical supports 150 may be attached to the frame 120 to support and maintain the frame 120 in a vertical orientation. For example, the vertical supports 150 may be attached to the frame 120 by welding, mechanical fasteners such as nuts and bolts or rivets, or adhesives such as glue or hook and loop.

In some embodiments, the vertical supports 150 may be configured to secure the frame 120 at an approximate eye level of passersby. For example, the vertical supports 150 may have a length such that a vertically central portion of the frame 120 may be approximately eye level for most passersby, where an upper portion of the frame 120 may be eye level for taller passersby and a lower portion of the frame 120 may be eye level for shorter passersby. Alternatively, and/or additionally, the vertical supports 150 may have a length sufficient for the bottom of the frame 120 to clear the top of the trash receptacle 170 while not interfering with the use of the trash receptacle 170. For example, the vertical supports 150 may suspend the frame 120 at least one foot above the top of the trash receptacle 170 so that the trash receptacle 170 may still be used. Alternatively, and/or additionally, the vertical supports 150 may suspend the frame 120 above a rear portion of the trash receptacle 170 such that the trash receptacle 170 may be used without interference. For example, the vertical supports 150 may suspend the frame 120 by a smaller amount than if the frame 120 was located centrally above the trash receptacle 170, but the frame 120 may be located toward a rear portion of the trash receptacle 170 which may permit continued use of the trash receptacle 170.

In some embodiments, the vertical supports 150 may include cables, wires, straps, or other similar materials that may be configured to suspend the frame 120 from a ceiling or other location above the frame 120. Alternatively, and/or additionally, the frame 120 may be configured to rest upon a surface, such as a countertop, and the vertical supports 150 may include supports that maintain the frame 120 in an upright position. In some embodiments, the device 100 may be configured to attach to other items or surfaces and may not include any vertical supports 150. For example, the device 100 may be configured to have the frame 120 undermounted directly to a cabinet nearby a trash receptacle 170, as shown in FIG. 3.

In some embodiments, the base portion 160 may include the same, or similar materials as the frame 120 and/or the vertical supports 150. For example, the base portion 160 may comprise metal components such as aluminum or stainless steel; plastic components such as cellulose acetate or a blended nylon composition; wooden materials; and other suitable elements that may be capable of supporting and stabilizing the vertical supports 150.

In some embodiments, the base portion 160 may be configured to encircle the trash receptacle 170, which may include surrounding the trash receptacle 170 including instances in which the trash receptacle 170 is a shape other than round. For example, in instances in which the trash receptacle 170 is rectangular, the base portion 160 may be rectangular to encircle the trash receptacle 170. In instances in which the trash receptacle 170 is round, the base portion 160 may be round to encircle the trash receptacle 170. In these and other embodiments, the base portion 160 may be configured to have a similar shape to that of the trash receptacle 170 so that the base portion 160 may encircle the trash receptacle 170.

In some embodiments, the base portion 160 may include a flat plate configured to lie flat on the surface on which the device 100 is located. Alternatively, and/or additionally, the flat plate base portion 160 may be configured to receive the trash receptacle 170 on top of the flat plate base portion 160 which may help stabilize the device 100. For example, the weight of the trash receptacle 170 may contribute to the stability of the device 100 by lowering the center of gravity of the device.

In these and other embodiments, the base portion 160 may be attached to the vertical supports 150 by way of welding, mechanical fasteners such as nuts and bolts or rivets, or various adhesives such as glue or hook and loop.

Figure 2:
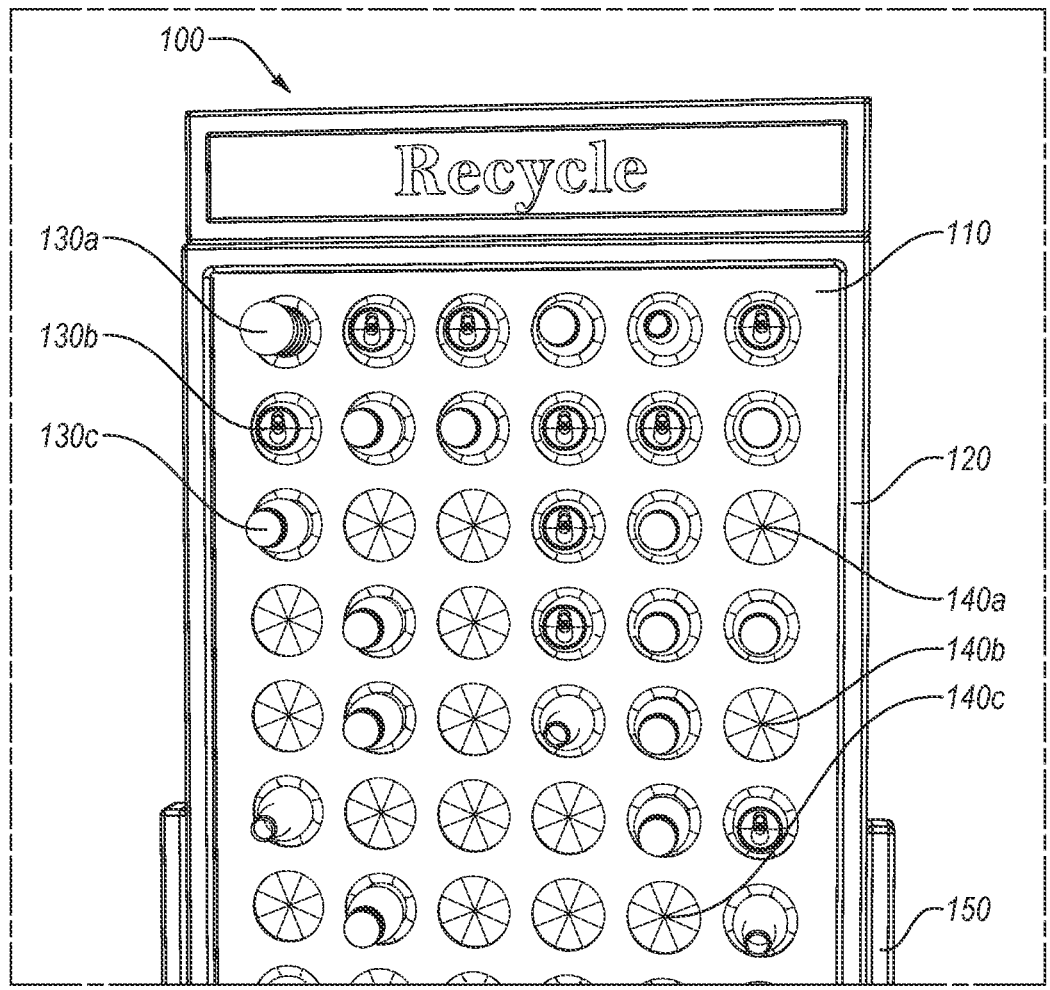
FIG. 2 illustrates another perspective view of a portion of the container apparatus for storing and displaying recyclable objects shown in FIG. 1.

FIG. 2 illustrates another perspective view of a portion of the container apparatus for storing and displaying recyclable objects shown in FIG. 1, in accordance with at least one embodiment described in the present disclosure. In particular, FIG. 2 provides a detailed view of the device 100, the rigid member 110, the frame 120, the apertures 130, the flexible members 140, and an upper portion of the vertical supports 150. In addition, FIG. 2 better illustrates the variety of different recyclable containers that may be received and retained by the device 100.

FIG. 3 illustrates a perspective view of another exemplary container apparatus for storing and displaying recyclable objects, in accordance with at least one embodiment described in the present disclosure. In particular, FIG. 3 illustrates the device 300 that may include a rigid member 310, a frame 320, apertures 330, and flexible members 340 in an embodiment where the device 300 is undermounted to a cabinet. In some embodiments, the rigid member 310, the frame 320, the apertures 330, and the flexible members 340 may be analogous to the rigid member 110, the frame 120, the apertures 130, and the flexible members 140 of FIG. 1, respectively. As described above, in some embodiments, the device 100 may not include vertical supports (such as vertical supports 150 of FIG. 1) or a base portion (such as base portion 160 of FIG. 1).

Figure 4:
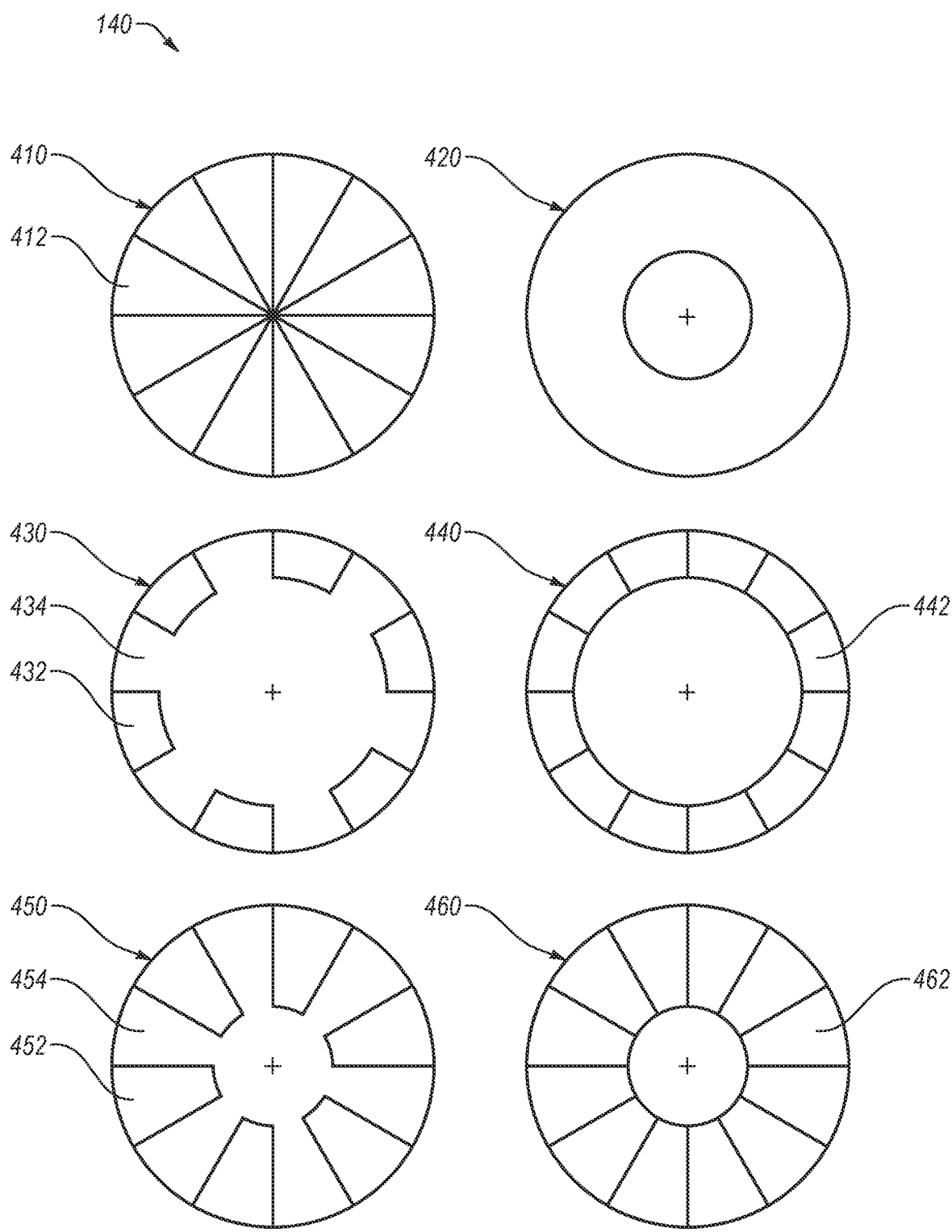
FIG. 4 illustrates a front view of example configurations of a flexible member that may be used with a container apparatus for storing and displaying recyclable objects.

FIG. 4 illustrates a front view of example configurations of flexible members 140 that may be used with a container apparatus for storing and displaying recyclable objects, in accordance with at least one embodiment described in the present disclosure. The flexible members 140 may include a first configuration 410, including first sectors 412, a second configuration 420, a third configuration 430, including third sectors 432 and third gaps 434, a fourth configuration 440, including fourth sectors 442, a fifth configuration 450, including fifth sectors 452 and fifth gaps 454, and a sixth configuration 460, including sixth sectors 462.

In some embodiments, the flexible members 140 may be circular to mimic the apertures with which the flexible members 140 are centered and aligned. In these and other embodiments, the flexible members 140 may be partitioned into sectors, such as first sectors 412, third sectors 432, fourth sectors 442, fifth sectors 452, and/or sixth sectors 462. For example, the first configuration 410 includes a flexible member that is divided into twelve equal-sized sectors 412, where the segment lines run from the lateral edge of the flexible member 140 to a central point of the depicted circle. In some embodiments, the segment lines defining the sectors 412 may not extend fully to the center of the flexible members 140. For example, the fourth configuration 440 includes a flexible member 140 that is divided into twelve equal-sized sectors 442, where the segment lines run from the lateral edge of the flexible member 140 to a smaller interior circle located inside the flexible member 140, the smaller interior circle having the same center point as the flexible member 140, the fourth configuration 440 forming a thin ring shape. In another example, the sixth configuration 460 may be similar to the fourth configuration 440 but may have a smaller interior circle than the interior circle of the fourth configuration, such that the sixth configuration 460 may form a thick ring shape.

In some embodiments, the sectors, including first sectors 412, third sectors 432, fourth sectors 442, fifth sectors 452, and/or sixth sectors 462 of the flexible members 140 may include gaps, such as third gaps 434 and/or fifth gaps 454, between the next closest sector, such as third sectors 432 and/or fifth sectors 452. Alternatively, and/or additionally, the configurations of the flexible members 140 that include gaps, including third gaps 434 and/or fifth gaps 454, between the sectors, such as third sectors 432 and/or fifth sectors 452, may include various sized ring shapes. For example, the thickness of the ring shape of the third configuration 430 may be similar to the thickness of the fourth configuration 440, but the third gaps 434 may be included between the third sectors 432 of the third configuration 430. Continuing the example, the number of third sectors 432 in the third configuration 430 may be similar to the number of fourth sectors 442 in the fourth configuration 440, but every other third sector 432 may not be present so as to create the third gaps 434 between the remaining third sectors 432 of the third configuration 430.

In another example, the thickness of the ring shape of the fifth configuration 450 may be similar to the thickness of the sixth configuration 460, but the fifth configuration 450 may include the fifth gaps 454 between the fifth sectors 452. Continuing the example, the number of fifth sectors 452 in the fifth configuration 450 may be similar to the number of sixth sectors 462 in the sixth configuration 460, but every other fifth sector 452 may not be present so as to create the fifth gaps 454 between the remaining fifth sectors 452 of the fifth configuration 450.

In some embodiments, the ring shape of the flexible members 140 may not include segments dividing the flexible members 140 into sectors. In some embodiments, the flexible members 140 may include one unbroken piece of material, with a circular hole in the middle configured to receive a recyclable container. In these and other embodiments, in instances in which the flexible members 140 are comprised of an unbroken piece of material, the unbroken piece of material may be elastic in nature. In an exemplary embodiment, the second configuration 420 illustrates a flexible member 140 with a circular hole and no segments or sectors dividing up the flexible member 140. The circular hole of the flexible member 140 in the second configuration 420 may be smaller than a recyclable container, but the elasticity of the flexible member 140 may permit the flexible member 140 to expand to allow a recyclable container to be received and retained in the aperture 130. Further, once a recyclable container is removed from the flexible member 140 in the aperture 130, the circular hole of the flexible member 140 in the second configuration 420 may contract back to the pre-recyclable container diameter.

In some embodiments, the different configurations of flexible members 140 may include pairings with different flexible members 140 materials having different structural strengths. For example, a studier material, such as rubber, may be used in a configuration such as the third configuration 430 or the fifth configuration 450, where less sectors, such as third sectors 432 and/or fifth sectors 452, may be present in the flexible member 140, where it may be desired to include additional structure to retain a recyclable container. In another example, a weaker material, such as silicone, may be used in a configuration such as the first configuration 410 or the sixth configuration 460, where more sectors, such as first sectors 412 and/or sixth sectors 462, may be present in the flexible member 140 or where the sectors, such as first sectors 412 and/or sixth sectors 462, are longer.

Although depicted as flexible members 140 having equal or similar areas, it will be appreciated that the area of the flexible members may vary between apertures and between different configurations of flexible members 140. For example, a first flexible member with the first configuration 410 may include a first area and a second flexible member with the first configuration 410 may include a second area. In another example, a first flexible member with the first configuration 410 may include a third area and a second flexible member with the second configuration 420 may include a fourth area.

FIG. 5 illustrates a top view of an example container apparatus for storing and displaying recyclable objects, in accordance with at least one embodiment described in the present disclosure. In particular, FIG. 5 provides a top view of a frame portion, such as frame 120 of FIG. 1. In some embodiments, the device 500 may include a slit 510, a first groove 520a, a second groove 520b, collectively grooves 520, and a frame 530.

In some embodiments, the slit 510 may be located on the top portion of the frame 530. In some embodiments, the slit 510 may extend from a lateral edge of the first groove 520a to a lateral edge of the second groove 520b. In these and other embodiments, the slit 510 may be sized and configured to receive a rigid member, such as the rigid member 110 of FIG. 1. In some embodiments, the slit 510 may be sized and configured to receive a rigid member, such as rigid member 110 of FIG. 1, and may allow the rigid member to pass through the top element after which it may be received into the groove 520. For example, the slit 510 may include a width sufficient to receive the thickness of the rigid member plus an additional small amount to account for the thickness of flexible members, such as flexible members 140 of FIG. 1, that may be attached thereto. In these and other embodiments, the thickness of the slit 510 may be marginally wider than the thickness of the grooves 520 where the slit 510 may need to receive both the rigid member and the flexible members attached thereto, but the grooves 520 may only receive the rigid member.

In some embodiments, the frame 530 may be rectangular in shape and may include grooves 520 on medial edges of the side portions thereof and may also include grooves 520 on a medial edge of the bottom portion thereof. The frame 530 may be analogous to the frame 120 of FIG. 1.

In some embodiments, a medial portion of the two sides and bottom elements of the frame 530 may include grooves 520 sized and configured to receive an edge of a rigid member, such as rigid member 110 of FIG. 1. For example, grooves 520 on the frame 530 may be sized to be marginally larger than the thickness of the rigid member such that the rigid member slides in to, and is retained in, the grooves 520 on the frame 530.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A container storage device, comprising:
   a rectangular rigid member;
   a plurality of apertures distributed throughout the rectangular rigid member;
   a plurality of flexible members affixed to the rectangular rigid member, wherein a center point of the plurality of flexible members is configured to align with a center point of the plurality of apertures, such that one flexible member of the plurality of flexible members is associated with one aperture of the plurality of apertures, wherein the plurality of flexible members are configured to hold recyclable objects within the plurality of apertures;
   a rectangular frame comprising:
      a top side including a slit that spans a lengthwise portion of the top side;
      a first side including a first medial edge that contains a first groove;
      a second side including a second medial edge that contains a second groove; and a bottom side including a third medial edge that contains a third groove,
wherein the first side is substantially parallel to the second side, the top side is substantially parallel to the bottom side, the first side and the second side are substantially perpendicular to the top side and the bottom side, and
wherein the slit is sized and configured to allow the rectangular rigid member and the plurality of flexible members affixed thereto to pass through, and the edges of the rectangular rigid member are received into the first groove, the second groove, and the third groove;
at least one elongated vertical support member affixed to the rectangular frame; and
a base portion affixed to the at least one elongated vertical support, configured to maintain the at least one elongated vertical support in a vertical orientation.

2. The container storage device of claim 1, where the first side, the second side, the top side, and the bottom side are substantially planar.

3. The container storage device of claim 1, wherein the plurality of apertures are round in shape.

4. The container storage device of claim 1, wherein the plurality of apertures include different sized openings.

5. The container storage device of claim 4, wherein the different sized openings are sized and configured to receive at least one of a plastic bottle, a glass bottle, or an aluminum can.

6. The container storage device of claim 1, wherein the flexible members are bonded to the rectangular rigid member.

7. The container storage device of claim 6, wherein bonded includes at least one of an adhesive, a mechanical fastener, a heat process, or a pressurized process.

8. The container storage device of claim 1, wherein the width of the slit is at least the sum of a thickness of the rectangular rigid member and a thickness of a thickest flexible member of the plurality of flexible members.

9. The container storage device of claim 1, wherein the rectangular rigid member extends beyond the slit.

10. The container storage device of claim 1, wherein the at least one elongated vertical support member is affixed to the rectangular frame using at least one of a welding, a mechanical fastener, or an adhesive.

11. The container storage device of claim 1, wherein base portion is affixed to the at least one elongated vertical support member using at least one of a welding, a mechanical fastener, or an adhesive.

12. A container storage device, comprising:
a rigid member comprising a plurality of apertures therethrough;
a frame sized and shaped to encase the rigid member, the frame comprising:
a top side including a slit that spans a lengthwise portion of the top side;
a first side including a first medial edge that contains a first groove;
a second side that is parallel to the first side and has a medial edge that contains a second groove; and
a bottom side that is parallel to the top side and has a medial edge that contains a third groove,
wherein the first side and the second side are perpendicular to the top side and the bottom side, and
wherein the first side, the second side, the top side, and the bottom side are substantially planar;
a plurality of flexible members configured to attach to the rigid member, wherein a center point of the plurality of flexible members is configured to align with a center point of the plurality of apertures, the plurality of flexible members being sized and configured to receive a plurality of recyclable containers; and
at least one vertical support configured to attach to the frame.

13. The container storage device of claim 12, wherein the rigid member is rectangular in shape and is configured to be inserted into the slit of the top of the frame, wherein an edge of the rigid member is sized and configured to be received into the first groove, the second groove and the third groove.

14. The container storage device of claim 13, wherein the rigid member extends beyond the slit of the top of the frame.

15. The container storage device of claim 12, further comprising a base portion configured to attach to the plurality of vertical supports, wherein the base portion is sized and configured to receive a trash receptacle.

16. The container storage device of claim 12, wherein the rigid member is substantially vertical when secured in the frame.

17. The container storage device of claim 12, wherein the plurality of apertures are round in shape.

18. The container storage device of claim 12, wherein a size of the plurality of apertures include a plurality of sizes.

19. The container storage device of claim 12, wherein the plurality of recyclable containers includes at least one of a glass bottle, a plastic bottle, or an aluminum can.

* * * * *